United States Patent
Kazami et al.

(10) Patent No.: US 6,321,204 B1
(45) Date of Patent: Nov. 20, 2001

(54) BUSINESS OPERATION MANAGEMENT SYSTEM

(75) Inventors: Ichiro Kazami; Fumihiro Soida; Yoshiki Shimomura; Satoaki Serikawa, all of Kikuchi-gun (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/021,243

(22) Filed: Feb. 10, 1998

(30) Foreign Application Priority Data

Feb. 26, 1997 (JP) .................................................. 9-041821

(51) Int. Cl.[7] .................................................. G06F 17/60
(52) U.S. Cl. .................................................. 705/7
(58) Field of Search .................................. 705/7, 8, 10, 1; 707/200, 10; 364/468.01, 468.05

(56) References Cited

U.S. PATENT DOCUMENTS

| | | | |
|---|---|---|---|
| 4,827,423 | * | 5/1989 | Beasley et al. . |
| 5,101,352 | * | 3/1992 | Rembert . |
| 5,237,495 | * | 8/1993 | Morii . |
| 5,260,866 | * | 11/1993 | Lisinski et al. . |
| 5,321,605 | * | 6/1994 | Chapman et al. . |
| 5,459,656 | * | 10/1995 | Fields et al. . |
| 5,767,848 | * | 6/1998 | Matsuzaki et al. . |

FOREIGN PATENT DOCUMENTS

02239364A * 9/1990 (JP) .
02000011048A * 1/2000 (JP) .

OTHER PUBLICATIONS

Wheelright, Steven et al, Creating Project Plans to Focus Product Development, Harvard Business Review p. 70, Dialog file 122, Accession No. 127705, Mar. 1992.*

* cited by examiner

Primary Examiner—Frantzy Poinvil
(74) Attorney, Agent, or Firm—Schwegman, Lundberg, Woessner & Kluth, P.A.

(57) ABSTRACT

A business operation management system has a data bank which includes a rule database for registering data relative to rules of how to proceed with work, including data relative to business operation management manuals prescribed with respect to respective themes including business plans and new product development plans, a project management database for registering management data relative to details of each of the themes, a change management database for registering contents of changes in the management data, a problem management database for registering data indicative of rejected confirmed results, a technical report management database for registering solutions to problems and data indicative of accepted confirmed results, a reference classification management database for registering instruction contents, and a know-how management database for registering know-hows extracted from problems and confirmed results.

20 Claims, 4 Drawing Sheets

BUSINESS OPERATION MANAGEMENT SYSTEM

BACKGROUND OF THE INVENTION

1. Field of the Invention

The present invention relates to a business operation management system for smoothly promoting various business projects including business plans, new product development plans, and so on.

2. Description of the Prior Art

One known process of managing business operations in a project such as a new product development plan includes the step of managing the project, the step of managing business operations in the project, the step of managing changes in the project, the step of managing problems in the project, and the step of managing technical reports, and the step of managing know-hows to be referred to in promoting business activities in each of the previous steps.

In the step of managing the project, a schedule for developing the new product, parts orders, and test dates are planned. In the step of managing business operations in the project, operations including designing of the new product, production of prototypes, and experiments are planned on a daily basis. In the step of managing changes in the project, design changes are made on the basis of the prototypes and experimental results. In the step of managing problems in the project, defects caused in the development of the new product are recorded. In the step of managing technical reports, test results produced in the development of the new product are recorded as technical reports.

In each of the steps of the conventional process of managing business operations, however, rules about how to proceed with work, such as latest business operation management manuals, may not be referred to, and persons in charge must perform business operations based on memorized old rules about how to proceed with work. As a result, the project may not smoothly be carried on.

SUMMARY OF THE INVENTION

It is therefore an object of the present invention to provide a business operation management system which is capable of flexibly handling changes in plans and averaging the burdens on persons in charge of a project.

According to the present invention, there is provided a business operation management system having a data bank comprising a rule database for registering data relative to rules of how to proceed with work, including data relative to business operation management manuals prescribed with respect to respective themes including business plans and new product development plans, a project management database for registering management data relative to details of each of the themes, a change management database for registering contents of changes in the management data, a problem management database for registering data indicative of rejected confirmed results, a technical report management database for registering solutions to problems and data indicative of accepted confirmed results, a reference classification management database for registering instruction contents, and a know-how management database for registering know-hows extracted from problems and confirmed results.

The rule database is referred to when data are registered in the project management database, the change management database, the problem management database, the technical report management database, the reference classification management database, and the know-how management database, and when business operations are carried out.

When themes including business plans and new product development plans are inputted, the rules of how to proceed with work with respect to the themes, which are registered in the rule database, are referred to, and the themes are carried out on the basis of the rules.

For carrying out the themes, the rule database is referred to, and the change management database and the know-how management database are referred to for selecting required business operations from the project management database.

When data relative to changes in work are inputted, the rules corresponding to the data relative to changes, which are registered in the rule database, are referred to, and required business operations required with respect to the data relative to changes are selected on the basis of the rules.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

A business operation management system according to the present invention has a computer (not shown) which comprises a central processing unit (CPU), memories, and input/output interfaces. One of the memories stores a program which is run by the CPU to execute a business operation management process.

Figure 1:
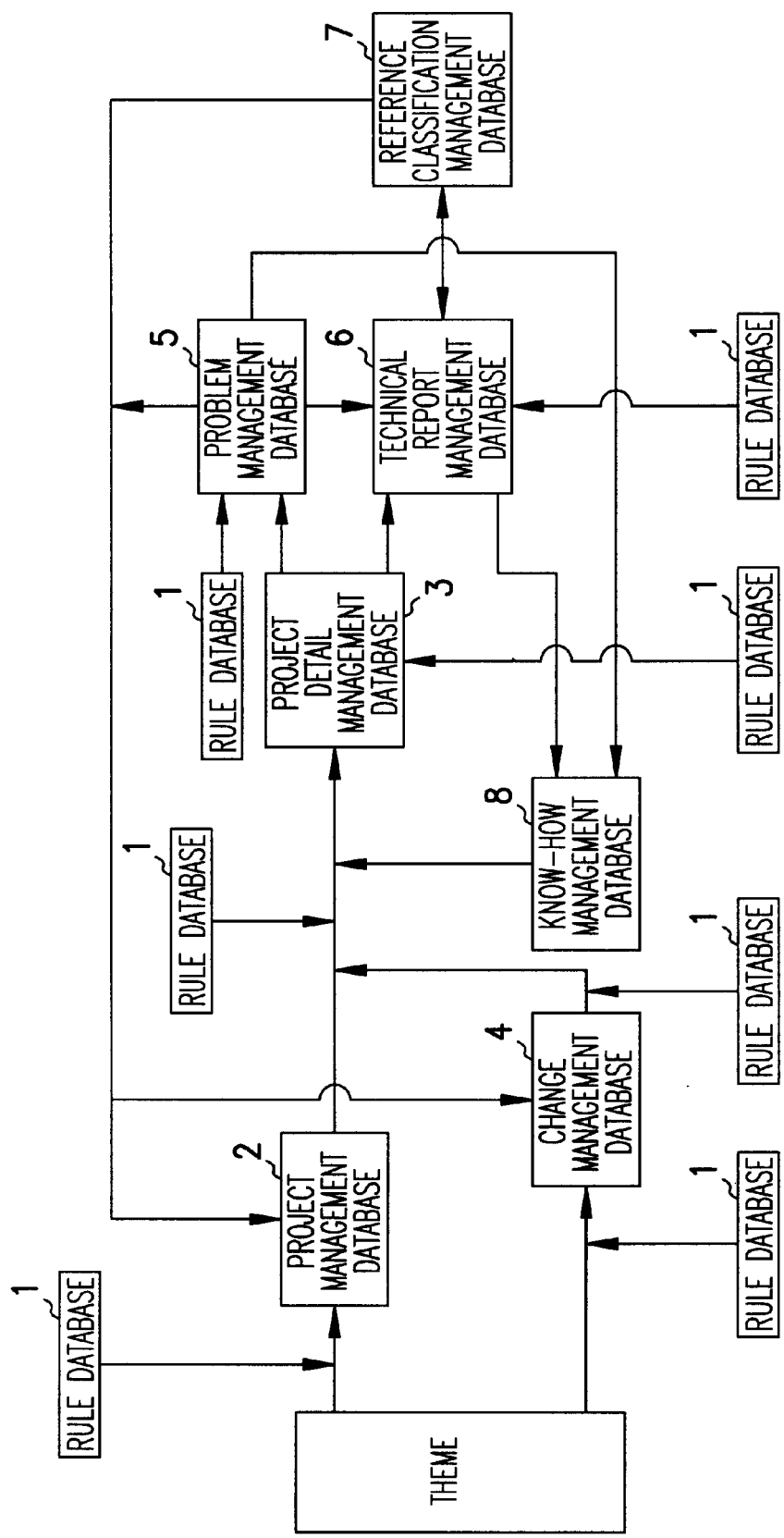
FIG. 1 is a block diagram of a data bank incorporated in a business operation management system according to the present invention.

The business operation management system also has, as shown in FIG. 1, a data bank including rule databases 1, a project management database 2, a project detail management database 3, a change management database 4, a problem management database 5, a technical report management database 6, a reference classification management database 7, and a know-how management database 8.

The rule databases 1 store data relative to rules about how to proceed with work, including data relative to business operation management manuals, law and regulation classifications, factory codes, department codes, large business operation classifications, large business operation classification titles, medium business operation classifications, medium business operation classification titles, business operation codes, business operation titles, 5W1H (why, how, who, where, when, what), input sheets, output sheets, and a revision history.

The project management database 2 stores data relative to project codes, project titles, large business operation classifications, medium business operation classifications, business operation codes, event codes, scheduled dates, performed dates, instructors, persons in charge, purposes, targets, results, and result decisions.

The project detail management database 3 stores data relative to project codes, project titles, large business operation classifications, medium business operation classifications, business operation codes, event codes, scheduled dates, performed dates, instructors, persons in charge, purposes, targets, results, and result approvals which represent practical operations subdivided by breaking down projects registered in the project management database 2.

The change management database 4 stores data relative to project codes, project titles, change management numbers, change item codes, change purpose codes, change content codes, and change contents.

The problem management database 5 stores data relative to problem numbers, project codes, project titles, troubleshooters, item codes, degrees of importance, scheduled completion dates, promoters, degrees of development, item contents, detailed contents, causes, countermeasures, results, and cause codes.

The technical report management database 6 stores data relative to project codes, project titles, large business operation classifications, medium business operation classifications, business operation codes, event codes, dates, persons in charge, report numbers, problem numbers, know-how numbers, and item codes.

The reference classification management database 7 stores data relative to project codes, project titles, business operation codes, issued dates, persons in charge, purposes, item codes, instructed contents, promoters, report numbers, and problem numbers.

The know-how management database 8 stores data relative to change item codes, change purpose codes, change content codes, predicted phenomena, business operation codes (confirmed), and events (confirmed).

Figure 3:
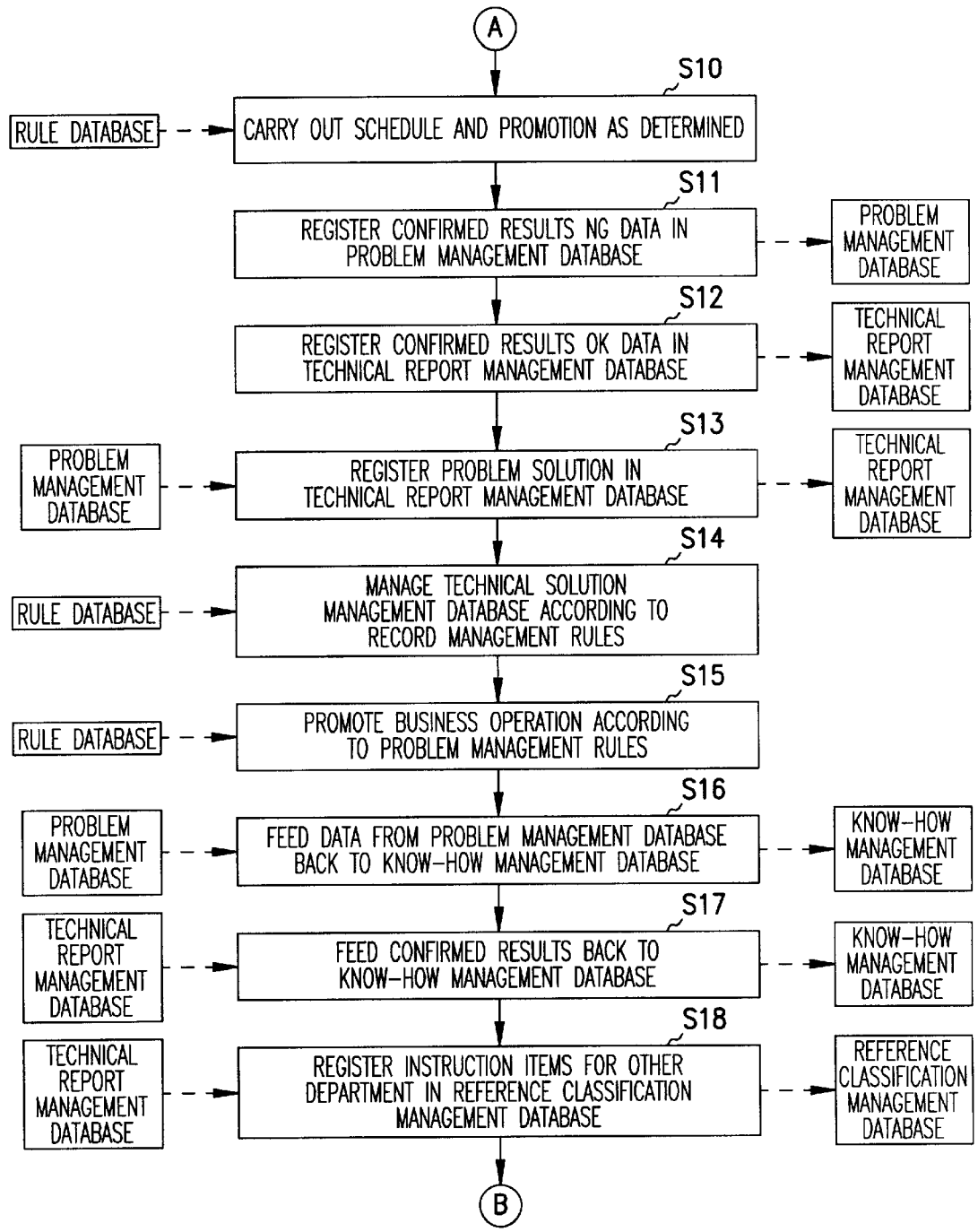
Figure 4:
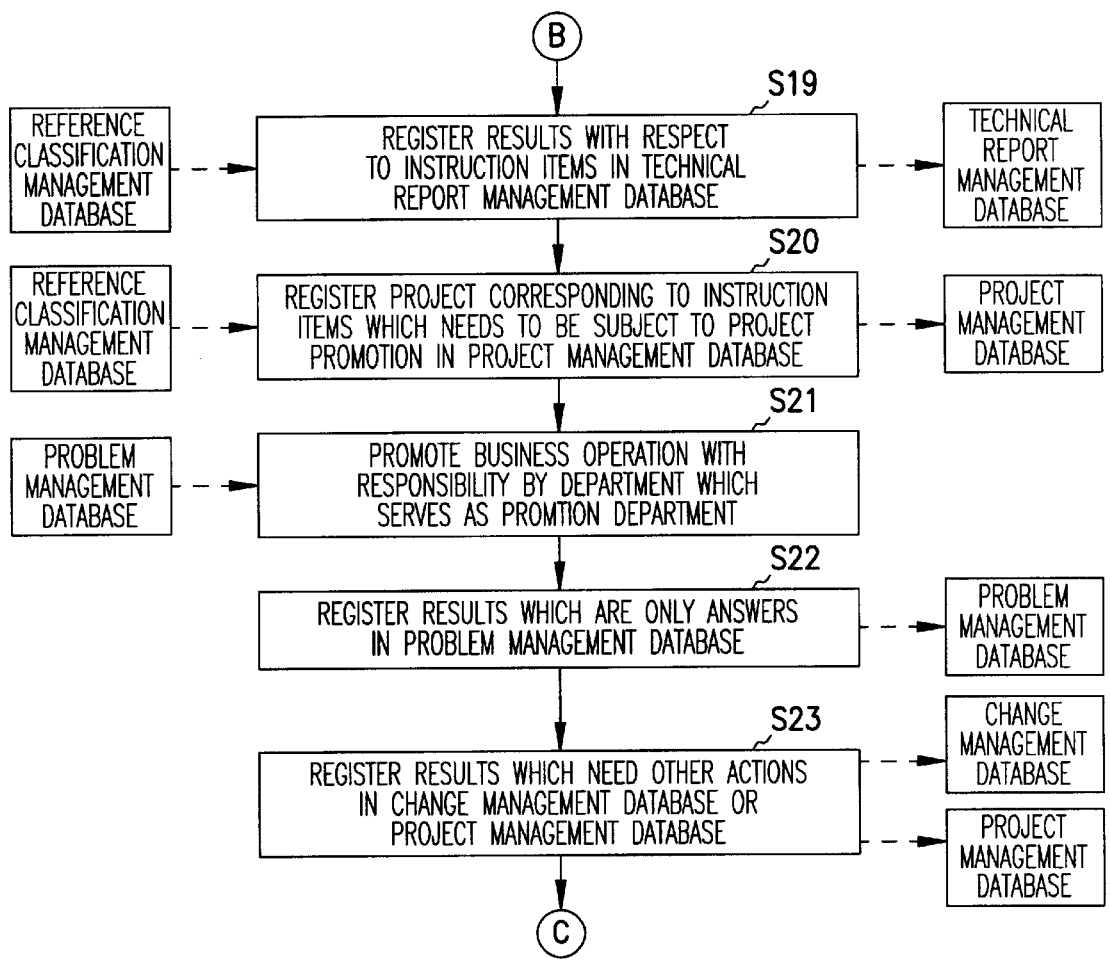

A process of proceeding with work based on the business operation management system will be described below with reference to FIGS. 2 through 4.

Figure 2:
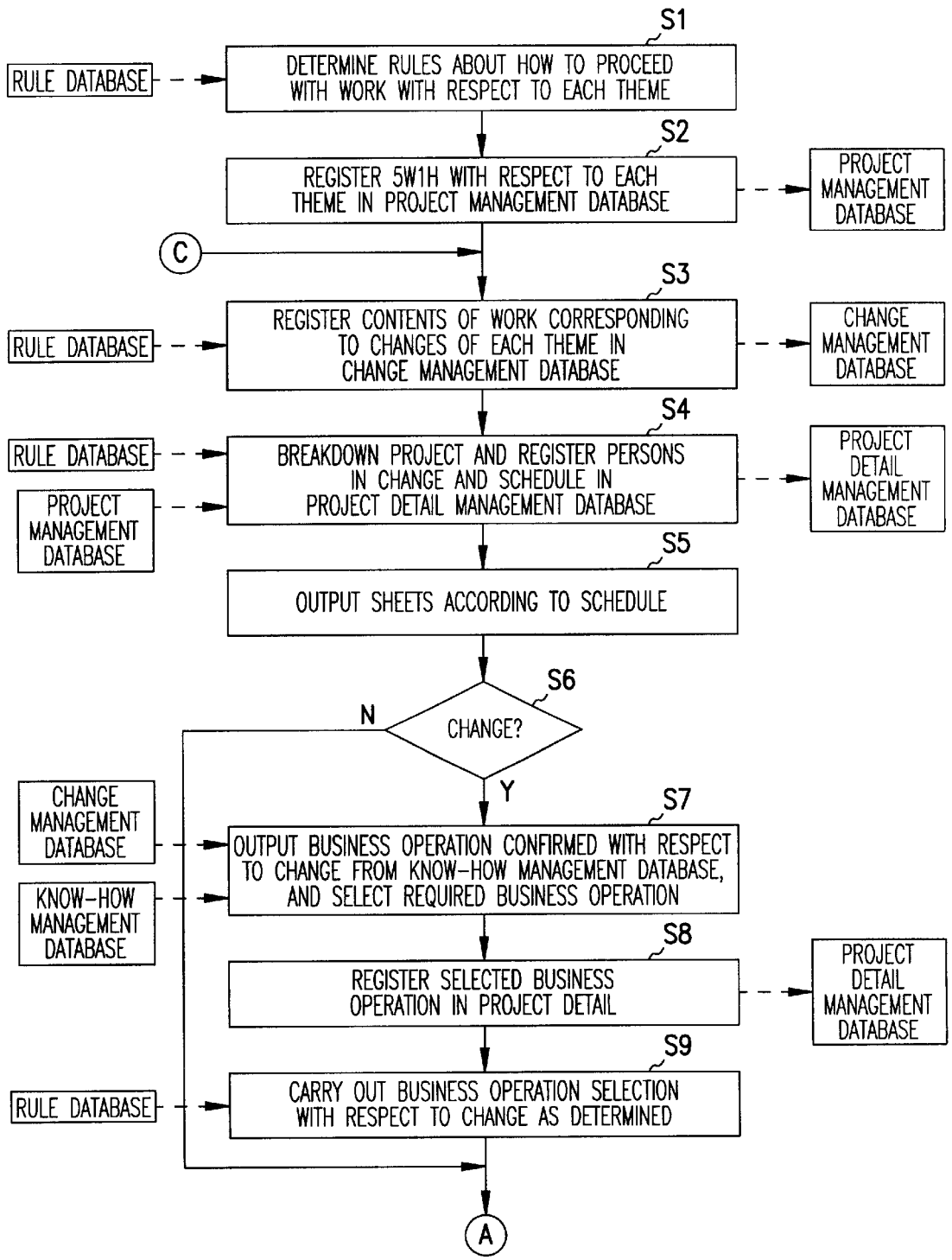
FIGS. 2, 3, and 4 are a flowchart of an operation sequence of the business operation management system.

As shown in FIG. 2, rules about how to proceed with work are determined on the basis of the rule databases 1 for respective themes in a step S1.

In a next step S2, data about 5W1H with respect to each theme are registered in the project management database 2 according to the rules determined in the step S1.

In a step S3, changes of each theme with respect to its basic concept and contents of work required by the changes are registered in the change management database 4 based on the rule databases 1.

In a step S4, a project registered in the project management database 2 is broken down into details, and persons in charge, a schedule, and so on are determined on the basis of the rule databases 1 and registered in the project detail management database 3.

In a step S5, registered items sheets according to the schedule are outputted on the basis of the project detail management database 3.

In a step S6, it is determined whether there is a change where work contents change with respect to each theme. If there is a change, then control proceeds to a step S7. If there is not a change, then control jumps to a step S10 (see FIG. 3).

In the step S7, business operations confirmed with respect to the change are outputted from the know-how management database 8, and a required business operation is selected from the outputted business operations.

In a step S8, the selected business operation is registered in the project detail management database 3.

In a step S9, business operation selection with respect to the change is carried out as determined on the basis of the rule databases 1.

In the step S10 (see FIG. 10), the schedule and promotion are carried out as determined on the basis of the rule databases 1.

In a step S11, confirmed results NG data, i.e., data indicative of rejected confirmed results, are registered in the problem management database 5.

In a step S12, confirmed results OK data, i.e., data indicative of accepted confirmed results, are registered in the technical report management database 6.

In a step S13, a solution to a problem is registered in the technical report management database 6 based on the problem management database 5.

In a step S14, the technical report management database 6 is managed according to record management rules based on the rule databases 1.

In a step S15, the business operation is promoted according to problem management rules based on the rule databases 1.

In a step S16, data are fed back from the problem management database 5 to the know-how management database 8.

In a step S17, confirmed results are fed back to the know-how management database 8 based on the technical report management database 6.

In a step S18, instruction items for other departments are registered in the reference classification management database 7 based on the technical report management database 6.

In a step S19, results with respect to the instruction items are registered in the technical report management database 6 based on the reference classification management database 7.

In a step S20, among all instruction items, the instruction items which needs to be subject to project promotion is registered in the project management database 2 based on the reference classification management database 7.

In a step S21, the business operation is promoted with responsibility by a department which serves as a promotion department, based on the problem management database 5.

In a step S22, results which serve as answers only are registered in the problem management database 5.

In a step S23, results which need other actions are registered in either the change management database 4 or the project management database 2.

After the step S23, control returns to the step S4, and the above steps are repeated until desired results are obtained.

In the business operation management system according to the present invention, as described above, since business operations are carried out while referring to the rule databases at all times, any contents of the business operations are prevented from being missed.

Changes in business operations can flexibly be coped with simply by changing the order of inputted data, without changing the program.

Furthermore, the burdens on persons in charge of carrying out business operations can be averaged.

Although there has been described what are at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

We claim:

1. A business operation management system having a data bank, comprising:

a computer program wherein the computer program when executed by a processor performs a business operation management process by:

determining rules about how to proceed with work based on a rule database for respective themes;

registering data about who, what, when, where, why, and how with respect to each theme in a project management database according to the rules determined in the determining step;

registering in a change management database changes of each theme with respect to the theme's basic concept and contents of work required by the changes based on the rule database;

breaking down a project registered in the project management database into details, persons in charge, and a schedule based on the rule database;

registering the details in a project detail management database;

outputting registered items sheets according to a schedule based on the project detail management database;

determining whether there is a change in work contents with respect to each theme;

when there is a change in work contents;
  outputting business operations confirmed with respect to the change from a know-how management database;
  selecting a required business operation from the outputted business operations, registering the selected business operation in the project detail management database; and
  carrying out business operation selection with respect to the change based on the rule database; and when there is not a change in work contents, carrying out the schedule and promotion based on the rule database.

2. The business operation management system of claim 1, wherein the program further comprises:

registering data indicative of rejected confirmed results in a problem management database;

registering data indicative of accepted confirmed results in a technical report management database;

registering a solution to a problem in the technical report management database based on the problem management database; and managing the technical report management database according to record management rules based on the rule database.

3. The business operation management system of claim 2, wherein the program further comprises:

feeding data from the problem management database to a know-how management database;

feeding confirmed results back to the know-how management database based on the technical report management database; and registering instruction items for other departments in a reference classification management database based on the technical report management database.

4. The business operation management system of claim 3, wherein the rule database registers data relative to rules of how to proceed with work, including data relative to business operation management manuals prescribed with respect to the respective themes including business plans and new product development plans;

wherein the project management database registers management data relative to details of each of the themes;

wherein the change management database registers contents of changes in the management data; and wherein the know-how management database registers know-hows extracted from problems and confirmed results.

5. The business operation management system of claim 4, wherein said rule database is referred to when data are registered in said project management database, said change management database, said problem management database, said technical report management database, said reference classification management database, and said know-how management database, and when business operations are carried out.

6. The business operation management system of claim 5, wherein when themes including business plans and new product development plans are inputted, the rules of how to proceed with work with respect to the themes, which are registered in the rule database, are referred to, and said themes are carried out on the basis of said rules.

7. The business operation management system of claim 6, wherein for carrying out the themes, said rule database is referred to, and said change management database and said know-how management database are referred to for selecting required business operations from said project management database.

8. The business operation management system of claim 6, wherein when data relative to changes in work are inputted, the rules corresponding to the data relative to changes, which are registered in the rule database, are referred to, and required business operations required with respect to said data relative to changes are selected on the basis of said rules.

9. A method of proceeding with work based on a business operation management system, comprising:

determining rules about how to proceed with work based on a rule database for respective themes;

registering data about who, what, when, where, why, and how with respect to each theme in a project management database according to the rules determined in the determining step;

registering in a change management database changes of each theme with respect to the theme's basic concept and contents of work required by the changes based on the rule database;

breaking down a project registered in the project management database into details, persons in charge, and a schedule based on the rule database;

registering the details in a project detail management database;

outputting registered items sheets according to a schedule based on the project detail management database;

determining whether there is a change in work contents with respect to each theme;
  when there is a change in work contents;
    outputting business operations confirmed with respect to the change from a know-how management database;
    selecting a required business operation from the outputted business operations;
    registering the selected business operation in the project detail management database; and
    carrying out business operation selection with respect to the change based on the rule database; and
  when there is not a change in work contents, carrying out the schedule and promotion based on the rule database.

10. The method of claim 9, further comprising:

registering data indicative of rejected confirmed results in a problem management database;

registering data indicative of accepted confirmed results in a technical report management database;

registering a solution to a problem in the technical report management database based on the problem management database; and managing the technical report management database according to record management rules based on the rule database.

11. The method of claim 10, further comprising:

feeding data from the problem management database to a know-how management database;

feeding confirmed results back to the know-how management database based on the technical report management database; and registering instruction items for other departments in a reference classification management database based on the technical report management database.

12. The method of claim 11, wherein the rule database registers data relative to rules of how to proceed with work, including data relative to business operation management manuals prescribed with respect to the respective themes including business plans and new product development plans, wherein the project management database registers management data relative to details of each of the themes;

wherein the change management database registers contents of changes in the management data; and wherein the know-how management database registers know-hows extracted from problems and confirmed results.

13. The method of claim 12, wherein said rule database is referred to when data are registered in said project management database, said change management database, said problem management database, said technical report management database, said reference classification management database, and said know-how management database, and when business operations are carried out.

14. The method of claim 13, wherein when themes including business plans and new product development plans are inputted, the rules of how to proceed with work with respect to the themes, which are registered in the rule database, are referred to, and said themes are carried out on the basis of said rules.

15. The method of claim 14, wherein for carrying out the themes, said rule database is referred to, and said change management database and said know-how management database are referred to for selecting required business operations from said project management database.

16. The method of claim 14, wherein when data relative to changes in work are inputted, the rules corresponding to the data relative to changes, which are registered in the rule database, are referred to, and required business operations required with respect to said data relative to changes are selected on the basis of said rules.

17. An apparatus, comprising:

memory; and a program stored in the memory, wherein when the program is executed on a central processing unit, the program performs a business operation management process by:

determining rules about how to proceed with work based on a rule database for respective themes;

registering data about who, what, when, where, why, and how with respect to each theme in a project management database according to the rules determined in the determining step;

registering in a change management database changes of each theme with respect to the theme's basic concept and contents of work required by the changes based on the rule database;

breaking down a project registered in the project management database into details, persons in charge, and a schedule based on the rule database;

registering the details in a project detail management database;

outputting registered items sheets according to a schedule based on the project detail management database;

determining whether there is a change in work contents with respect to each theme;

when there is a change in work contents;

outputting business operations confirmed with respect to the change from a know-how management database;

selecting a required business operation from the outputted business operations;

registering the selected business operation in the project detail management database; and carrying out business operation selection with respect to the change based on the rule database; and when there is not a change in work contents, carrying out the schedule and promotion based on the rule database.

18. The apparatus of claim 17, wherein the program further comprises:

registering data indicative of rejected confirmed results in a problem management database;

registering data indicative of accepted confirmed results in a technical report management database;

registering a solution to a problem in the technical report management database based on the problem management database; and managing the technical report management database according to record management rules based on the rule database.

19. The apparatus of claim 18, wherein the program further comprises:

feeding data from the problem management database to a know-how management database;

feeding confirmed results back to the know-how management database based on the technical report management database; and registering instruction items for other departments in a reference classification management database based on the technical report management database.

20. The apparatus of claim 19, wherein the rule database registers data relative to rules of how to proceed with work, including data relative to business operation management manuals prescribed with respect to the respective themes including business plans and new product development plans;

wherein the project management database registers management data relative to details of each of the themes;

wherein the change management database registers contents of changes in the management data; and wherein the know-how management database registers know-hows extracted from problems and confirmed results.

* * * * *